(12) United States Patent
Bartlett et al.

(10) Patent No.: US 11,234,432 B2
(45) Date of Patent: Feb. 1, 2022

(54) FOLDING SPRAY IMPLEMENTS HAVING LOW PEAK FOLD HEIGHT-TO-WINGSPAN RATIOS AND AGRICULTURAL WORK VEHICLES INCLUDING THE SAME

(71) Applicant: Deere & Company, Moline, IL (US)

(72) Inventors: Thomas G. Bartlett, Ankeny, IA (US); Daniel J. Koenen, Ankeny, IA (US); Garry E. Baxter, Ankeny, IA (US); John M. Schweitzer, Ankeny, IA (US); Kody A. Sjoblom, Altoona, IA (US); Alejandro P. Lynch, Buenos Aires (AR); Jeffrey J. Ringwald, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 232 days.

(21) Appl. No.: 16/507,209

(22) Filed: Jul. 10, 2019

(65) Prior Publication Data

US 2021/0007345 A1    Jan. 14, 2021

(51) Int. Cl.
*A01M 7/00* (2006.01)
*A01B 73/04* (2006.01)
*A01B 73/06* (2006.01)

(52) U.S. Cl.
CPC ......... *A01M 7/0075* (2013.01); *A01B 73/048* (2013.01); *A01B 73/067* (2013.01); *A01M 7/0042* (2013.01); *A01M 7/0053* (2013.01)

(58) Field of Classification Search
CPC .............. A01M 7/0042; A01M 7/0053; A01M 7/0075; A01M 7/0078; A01B 73/02;
(Continued)

(56) References Cited

U.S. PATENT DOCUMENTS

| 4,425,971 A | * | 1/1984 | Allen | ..................... A01B 73/02 172/311 |
| 5,927,606 A | * | 7/1999 | Patterson | ............ A01M 7/0075 239/167 |

(Continued)

FOREIGN PATENT DOCUMENTS

| CA | 2212220 A1 | 1/1999 |
| CN | 108739766 A | 11/2018 |

(Continued)

OTHER PUBLICATIONS

European Search Report issued in counterpart application No. 20186227.3 dated Jan. 15, 2021 (07 pages).

*Primary Examiner* — Alex M Valvis
(74) *Attorney, Agent, or Firm* — Klintworth & Rozenblat IP LLP

(57) ABSTRACT

Folding spray implements and agricultural work vehicle equipped with folding spray implements are provided. In embodiments, the folding spray implement includes a centerframe assembly, boom assemblies mounted to opposing sides of the centerframe assembly, and an actuation system coupled to the centerframe and boom assemblies. The boom assemblies include, in turn, inner wings pivotally joined to the centerframe assembly for rotation about frame-to-wing fold joints, as well as outer wings pivotally joined to the inner wings for rotation about wing-to-wing fold joints. The actuation system selectively transitions the folding spray implement: (i) from a stowed position in which axes of wing-to-wing fold joints extend principally in horizontal directions; (ii) through an intermediate unfolded position in which the axes of the wing-to-wing fold joints extend principally in vertical directions; and (iii) to a deployed position in which the axes of the wing-to-wing fold joints extend principally in horizontal directions.

18 Claims, 13 Drawing Sheets

(58) Field of Classification Search
CPC ..... A01B 73/04; A01B 73/042; A01B 73/044; A01B 73/046; A01B 73/06; A01B 73/062; A01B 73/065; A01B 73/067
See application file for complete search history.

(56) References Cited

U.S. PATENT DOCUMENTS

| | | | | |
|---|---|---|---|---|
| 5,992,759 | A * | 11/1999 | Patterson | A01C 23/00 239/159 |
| 7,150,419 | B1 * | 12/2006 | Tomlonovic | A01M 7/0053 239/722 |
| 7,581,597 | B2 * | 9/2009 | Neudorf | A01B 73/02 172/1 |
| 8,342,256 | B2 * | 1/2013 | Adams | A01B 73/065 172/311 |
| 8,899,496 | B2 * | 12/2014 | Wissler | A01M 7/0075 239/167 |
| 9,462,799 | B2 * | 10/2016 | Bouten | A01B 73/065 |
| 9,737,067 | B2 * | 8/2017 | Desai | A01G 25/09 |
| 2016/0037764 | A1 | 2/2016 | DePriest et al. | |
| 2016/0324137 | A1 | 11/2016 | Mellin | |

FOREIGN PATENT DOCUMENTS

| | | |
|---|---|---|
| EP | 2984927 A1 | 2/2016 |
| EP | 3437470 A1 | 6/2019 |
| GB | 2479028 A | 9/2011 |
| KR | 101845344 B1 | 4/2018 |

\* cited by examiner

FOLDING SPRAY IMPLEMENTS HAVING LOW PEAK FOLD HEIGHT-TO-WINGSPAN RATIOS AND AGRICULTURAL WORK VEHICLES INCLUDING THE SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to folding spray implements having low peak fold height-to-wingspan ratios and to agricultural work vehicles equipped with such folding spray implements.

BACKGROUND OF THE DISCLOSURE

Spray implements are utilized in conjunction with agricultural work vehicles to distribute flowable materials, such as spray solutions, over crop fields. Larger spray implements, such as those found onboard self-propelled sprayers, may have relatively expansive wingspans approaching or exceeding 30 meters in certain instances. Such broad-span spray implements typically feature foldable designs, which enable the spray implement to transition between a deployed, field-ready position and a more compact, stowed position for transportation. By common design, a folding spray implement includes two booms assemblies, which project laterally from opposing sides of a centerframe assembly attached to the chassis of the work vehicle. To enable folding of the spray implement, fold joints are provided at the interfaces between the centerframe assembly and the laterally-extending boom assemblies. Additional fold joints may also be provided along the respective lengths of boom assemblies and, specifically, at locations between different segments or "wings" of each boom assembly. A hydraulic cylinder, or another actuator, is provided at each fold joint and included in an actuation system. When commanded via operator controls within the cabin of the work vehicle, the actuation system strokes the hydraulic cylinders to rotate the boom assemblies about the fold joints in a sequenced manner transitioning the spray implement between the stowed and deployed positions.

SUMMARY OF THE DISCLOSURE

Folding spray implements for usage in conjunction with agricultural work vehicles are provided. In various embodiments, the folding spray implement includes a centerframe assembly, boom assemblies mounted to opposing sides of the centerframe assembly, and an actuation system coupled to the centerframe assembly and to the boom assemblies. The boom assemblies include, in turn, inner wings pivotally joined to the centerframe assembly for rotation about frame-to-wing fold joints, as well as outer wings pivotally joined to the inner wings for rotation about wing-to-wing fold joints. The actuation system is configured to selectively transition the folding spray implement: (i) from a stowed position in which fold axes of the wing-to-wing fold joints extend principally in horizontal directions; (ii) through an intermediate unfolded position in which the fold axes of the wing-to-wing fold joints extend principally in vertical directions; and (iii) to a deployed position in which the fold axes of the wing-to-wing fold joints extend principally in horizontal directions.

In further embodiments, the folding spray implement includes boom assemblies each containing wings pivotally joined at wing-to-wing fold joints. A centerframe assembly is mounted to a chassis of an agricultural work vehicle, with the boom assemblies joined to opposing sides of the centerframe assembly at frame-to-wing fold joints. An actuation system is coupled to the centerframe assembly and to the boom assemblies. The actuation system is configured to transition the folding spray implement between stowed and deployed positions in accordance with operator commands. When transitioning the folding spray implement from the stowed position toward the deployed position, the actuation moves the folding spray implement such that: (i) the inner wings swing outwardly from the chassis of the agricultural work vehicle by rotation about fold axes of the wing-to-frame fold joints; (ii) after the inner wings swing outwardly from the chassis of the agricultural work vehicle, a lower edge of the centerframe assembly is rotated upward in a manner placing the wing-to-wing fold joints in an orientation in which fold axes of the wing-to-wing fold joints extend principally in vertical directions; and (iii) the boom assemblies unfold by rotation of the outer wings relative to the inner wings about the fold axes of the wing-to-wing fold joints.

Agricultural work vehicles equipped with folding spray implements are further provided. In various embodiments, the agricultural work vehicle includes a chassis and a folding spray implement. The folding spray implement includes, in turn, a centerframe assembly mounted to the chassis, boom assemblies mounted to opposing sides of the centerframe assembly, and an actuation system. The boom assemblies have inner wings pivotally joined to the centerframe assembly for rotation about frame-to-wing fold joints, as well as outer wings pivotally joined to the inner wings for rotation about wing-to-wing fold joints. The actuation system is configured to selectively transition the folding spray implement: (i) from a stowed position in which fold axes of the wing-to-wing fold joints extend principally in horizontal directions; (ii) through an intermediate unfolded position in which the fold axes of the wing-to-wing fold joints extend principally in vertical directions; and (iii) to a deployed position in which the fold axes of the wing-to-wing fold joints extend principally in horizontal directions.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
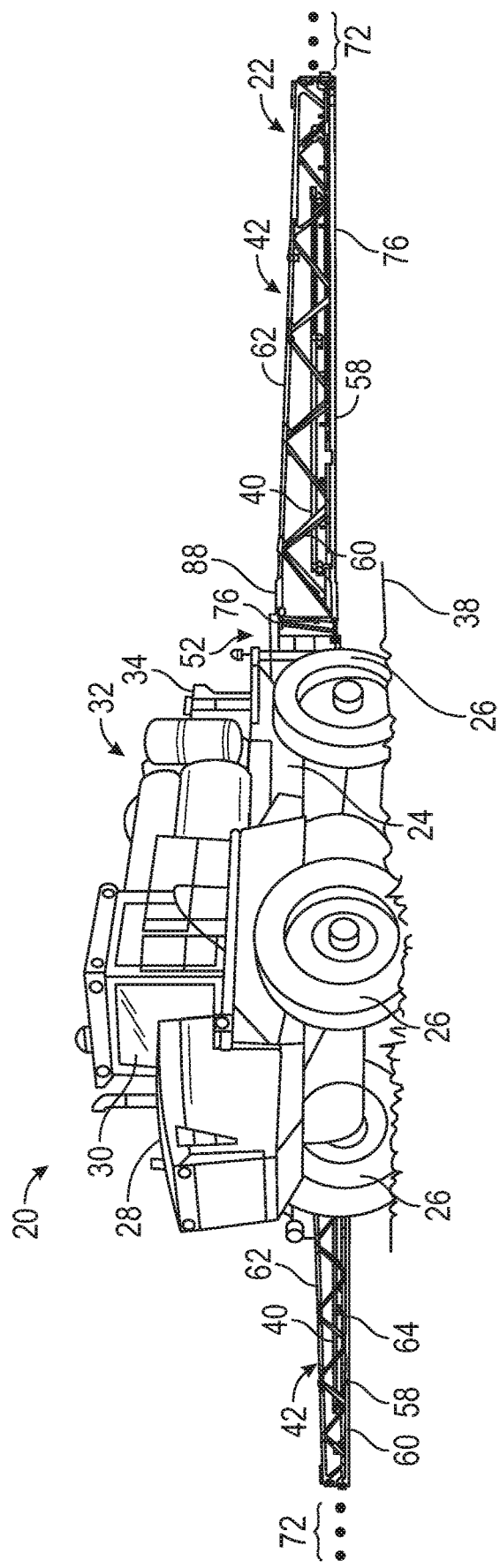
FIG. 1 is an isometric view of an agricultural work vehicle (here, a self-propelled sprayer) equipped with a folding spray implement, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As indicated above, larger spray implements utilized in conjunction with agricultural work vehicles commonly feature foldable designs. Such designs enable a foldable spray implement to transition between a deployed, field-ready position and a relatively compact, stowed position for transportation. A key physical parameter of folding spray implements is peak fold height; that is, the maximum height or apex (as measured vertically from the plane of the ground) reached by any portion of the folding spray implement when transitioning between the stowed and deployed positions. In many instances, it is desirable to minimize the peak fold height of a folding spray implement to, for example, decrease the likelihood of inadvertent physical contact between overhead objects (e.g., powerlines) and the spray implement when unfolding and unfolding. Further, regulations have been adopted in certain regions of the world limiting the peak fold height of folding spray implement to specified thresholds; e.g., ISO boom standards, presently adopted in Europe, restrict folding spray implements to a peak fold height of 4 meters or less.

Challenges arise when designing a folding spray implement having both a relatively limited peak fold height (e.g., a peak fold height<4 meters) and a relatively broad (e.g., >30 meter) wingspan when unfolded. Conventionally, such challenges have been overcome by further dividing or segmenting the boom assemblies into an increasing number of segments, arms, or "wings," which are joined by hinge or pivot couplings referred to here as "fold joints." Such a solution is sub-optimal, however, for multiple reasons. Generally, as the number of fold joints integrated into a given set of boom assemblies increases, so too does the overall part count, complexity, and manufacturing cost of the folding spray implement. Additionally, the introduction of additional fold joints and associated hardware features, including hydraulic cylinders or other fold actuators, along the respective lengths of the boom assemblies inexorably increases the cumulative mass of each boom assembly. This, in turn, results in increased moment forces acting about the fold joints as the folding spray implement transitions between the stowed and deployed positions, particularly when the additional fold joints are laterally spaced from the centerframe assembly by a relatively large distance. Reinforcement of support members (e.g., localized thickening of truss or beam members of the boom assemblies) in such regions subject to high transient loads may be necessitated, further increasing the overall weight and cost of the folding spray implement.

A technical problem is consequently encountered when attempting to design a folding spray implement having both a relatively broad wingspan and a limited peak fold heights, while further optimizing the overall part count, complexity, and manufacturing costs of the spray implement. Overcoming this technical problem, the following sets-forth folding spray implements having relatively low peak fold height-to-wingspan ratios, which permit a given spray implement to satisfy relatively stringent peak fold height restrictions, while beneficially (although not essentially) possessing a relatively broad (e.g., >30 meter) wingspan. Embodiments of the below-described folding spray implement include wing-to-wing fold joints and an actuation system, which repeatedly alters the orientation of the wing-to-wing fold joints as the spray implement transitions between its stowed (folded) and deployed (unfolded) positions. Specifically, the actuation system, in combination with the unique construction of the folding spray implement, enables rotation of the wing-to-wing fold joints about the longitudinal axis or pitch axis of the spray implement between (i) a first orientation in which fold axes of the wing-to-wing fold joints extend principally in horizontal directions, and (ii) a second orientation in which the fold axes of the wing-to-wing fold joints extend principally in vertical directions. The term "fold axis," as appearing herein, refers to the rotational axis or hinge line of a fold joint about which named portions of a folding spray implement (e.g., the boom assemblies, inner wings, or outer wings) rotate when spray implement transitions between stowed and deployed positions.

In various implementations, the actuation system may move the folding spray implement such that the wing-to-wing fold joints remain in the first orientation (in which the fold axes of the wing-to-wing fold joints extend in principally in horizontal directions) when the folding spray implement resides in the stowed and deployed positions. Conversely, the actuation system moves the wing-to-wing fold joints into the second orientation (in which the fold axes of the wing-to-wing fold joints extend in principally in horizontal directions) as the folding spray implement is moved thorough an intermediate unfolded position. In at least some instances, the fold axes of the wing-to-wing fold joints may extend substantially parallel to (i) the roll axis of the folding spray implement when in the stowed and deployed positions, and (ii) the yaw axis when the folding spray implement is in the intermediate unfolded position. The term "substantially parallel," as further appearing herein, utilized to refer two axes (or other named features) sharing an angular misalignment of 5 degrees or less.

By strategically orienting the wing-to-wing fold joints in the above-described manner, the boom assemblies may fold or unfold in a plane more closely aligned with a horizontal plane than a vertical plane; and, in certain implementations, the boom assemblies may unfold or fold in plane that is substantially parallel to or coplanar with a horizontal plane. The wingspan of the folding spray implement may be maximized as a result, while imparting the spray implement with a minimal number of fold joints and an exceptionally low peak fold height. Indeed, in certain instances, the wingspan of the folding spray implement may be rendered substantially independent of peak fold height, enabling the spray implement to be imparted with a broad (e.g., >30 meter) wingspan, if so desired, while satisfying stringent peak fold height restrictions. Concurrently, a reduction in the number of boom wings, actuators, and other associated features (e.g., conduit lines when the actuators assume the form of hydraulic cylinders) may be realized to reduce component count, cost, complexity, and the overall mass of the folding spray implement. As a still further benefit, moment forces acting to the wing-to-wing fold joints are reduced to lessen demands placed on the fold actuators and alleviate the degree to which support members necessitate localized reinforcement. These and other benefits are discussed in more detail below in connection with an example agricultural work vehicle and an example folding spray implement, as will now be described in connection FIGS. 1-13.

Self-Propelled Sprayer Equipped with an Example Folding Spray Implement

FIG. 1 is an isometric view of a self-propelled sprayer 20 equipped with a folding spray implement 22, as illustrated in accordance with an example embodiment of the present disclosure. The folding spray implement 22 is mounted to the rear or aft end of the chassis 24 of the sprayer 20 in the illustrated example; however, in further embodiments, the folding spray implement 22 may be mounted to another portion of the sprayer 20 (e.g., the front end of the chassis 24) or, instead, implemented as a towable unit. The chassis 24 of the sprayer 20 is supported by a number of ground-engaging wheels 26, which are driven by an engine contained in an engine compartment 28 adjacent an operator station or cabin 30 of the sprayer 20. A spray material delivery system 32 is carried by the chassis 24 and includes a supply tank 34, which holds a spray solution (or other liquid material) for distribution by the sprayer 20. The spray material delivery system 32 further includes a number of spray nozzles 36 (identified in FIG. 2), which are spaced along the length or longitudinal axis of the folding spray implement 22. When active, the spray material delivery system 32 draws spray solution from the supply tank 34 and provides this solution to the spray nozzles 36 for distribution across a crop field 38. The spray solution is conducted from the supply tank 34 to the nozzles 36 via a number of conduit features 40 (e.g., feed pipes, supply pipes, flexible tubing, etc.) as the sprayer 20 travels over the field 38 under operator command.

Figure 2:
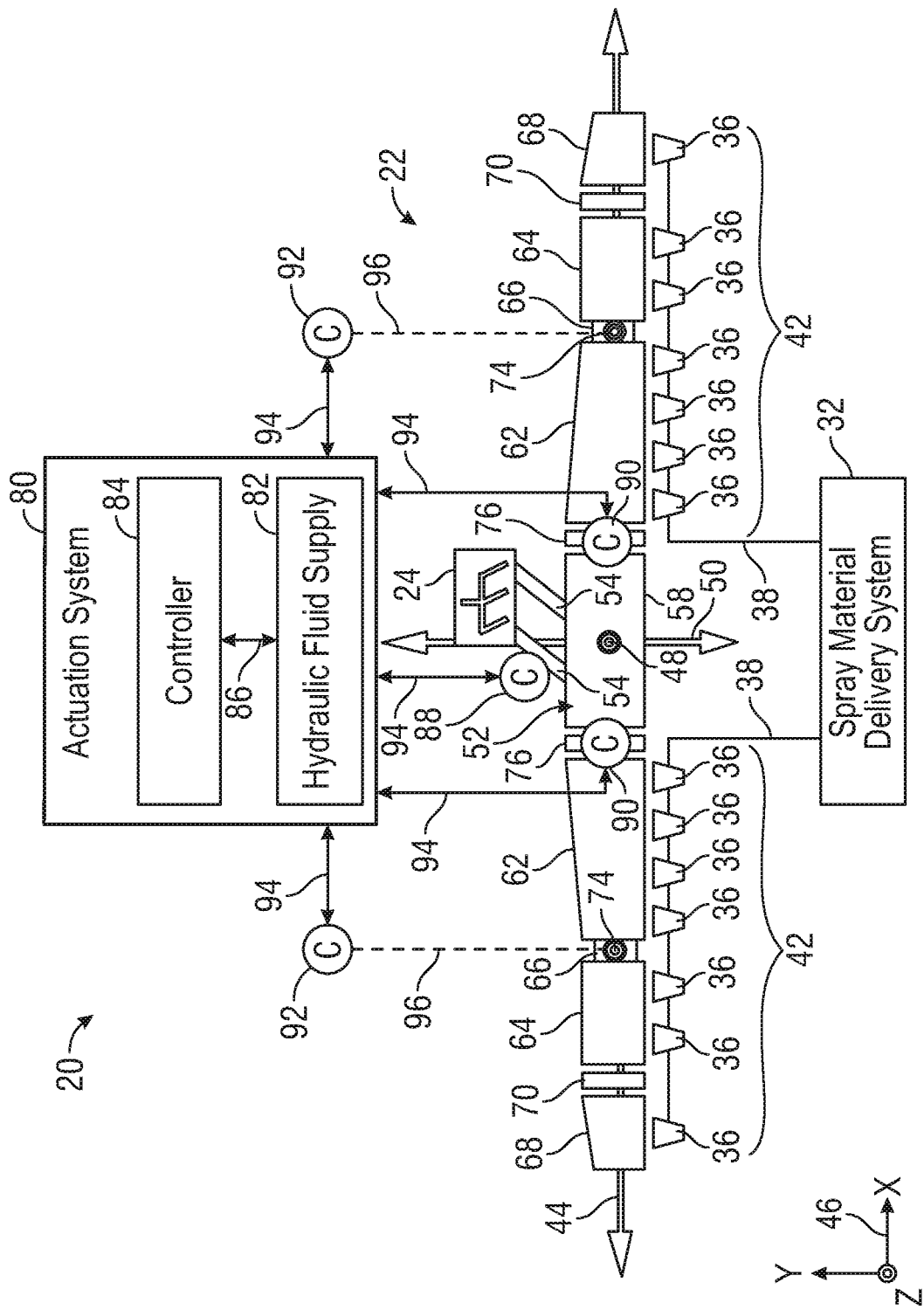
FIG. 2 is a schematic depicting components suitably included in the example folding spray implement shown in FIG. 1.

Referring now to FIG. 2 in conjunction with FIG. 1, the example folding spray implement 22 includes two laterally-extending boom assemblies 42. The term "lateral," as appearing herein, is defined as a direction parallel to the longitudinal or pitch axis of the folding spray implement 22 (identified in FIG. 2 by double-headed arrow 44). The boom assemblies 42 are substantially identical in the illustrated example and will be consequently described below as such, with like reference numerals utilized to identify like structural components. It is possible, however, for the boom assemblies 42 to differ relative to one another to varying extents in further implementations of the folding spray implement 22. Reference is also made to the pitch, roll, and yaw axes of the folding spray implement 22 below. As just stated, the pitch axis of the folding spray implement 22 is represented by double-headed arrow 44 in FIG. 2 and extends parallel to the X-axis of a coordinate legend 46 appearing in the bottom left of this drawing figure (again, also representative the longitudinal axis of the spray implement 22). Comparatively, the roll axis of the folding spray implement 22 is represented by symbol 48 and extends parallel to the Z-axis of the coordinate legend 46. Finally, the yaw axis of the spray implement 22 is represented by double-headed arrow 50 and extends parallel to the Y-axis of the coordinate legend 46.

The boom assemblies 42 of folding spray implement 22 are joined to opposing sides of a centerframe assembly 52. The centerframe assembly 52 is, in turn, mounted to the chassis 24 of the self-propelled sprayer 20; e.g., as schematically shown in FIG. 2, a number of bar links 54 arranged as a multi-bar linkage (or another mechanical linkage) may join a first centerframe structure 56 included in centerframe assembly 52 to the sprayer chassis 24. The centerframe assembly 52 may have various constructions suitable for supporting the boom assemblies 42, while permitting some degree of movement of the assemblies 42 relative to the chassis 24 in embodiments. In the schematic of FIG. 2, which further corresponds to the example implementation shown in FIGS. 3-12 discussed below, the centerframe assembly 52 has a fixed configuration. Accordingly, the centerframe assembly 52 includes a single, fixed centerframe, which is generally unable to rotate relative to the sprayer chassis 24 about the roll axis 48 or the yaw axis 50. In other embodiments, the centerframe assembly 52 may have a suspended configuration and further include a suspended centerframe to which the boom assemblies 42 are connected. In this case, the suspended centerframe, and therefore the boom assemblies 42, may be movable relative to the sprayer chassis 24 in a number of additional degrees of freedom (DOFs) within proscribed limits. Additional description in this regard is provided below in connection with FIG. 13.

As may the centerframe assembly 52, the boom assemblies 42 of the folding spray implement 22 may have various constructions suitable for supporting the spray nozzles 36 and other requisite features of the spray implement 22. In the illustrated example, and as most clearly shown in FIG. 1, the boom assemblies 42 are each principally constructed of a frame, truss, or skeletal structure. The boom assembly frames are each assembled from a number of interconnected beam elements 58, 60 including, for example, longitudinal-extending beams 58 and angled cross-beam members 60. In embodiments, some or all of beam elements 58, 60 may be formed from composite materials, such as a carbon fiber material, for weight reduction purposes. In other embodiments, the beam elements 58, 60 may be formed from a different material, such as a rolled steel or aluminum tubing.

The boom assemblies 42 are each divided or segmented into a number of different segments, arms, or wings, which are pivotally or hingedly joined in an end-to-end relationship. In the illustrated example, each boom assembly 42 includes an inner wing 62 and an outer wing 64. Only the inner wings 62 of the boom assemblies 42 are shown in FIG. 1, as indicated by ellipsis symbol 72; whereas the boom assemblies 42 are schematically shown in their entirety in FIG. 2. The boom assembly wings 62, 64 are pivotally joined at wing-to-wing fold joints 66 and, thus, are capable of relative rotation about the axes of the fold joints 66, as discussed more fully below. In addition to the wings 62, 64, each boom assembly 42 may also include an outer breakaway segment 68, which is joined to the outer wing 64 opposite the inner wing 62 by a breakaway joint or mechanism 70.

In alternative embodiments, the boom assemblies 42 can include a greater number of pivotally-joined wings or segments. However, as indicated above, one useful aspect of the folding spray implement 22 pertains to the ability to minimize the number of wing segments included in each boom assembly 42, while still imparting the spray implement 22 with a relatively broad wingspan. Consequently, in certain implementations, each boom assembly 42 will include two pivotally-joined wings or segments and, therefore, a single wing-to-wing fold joint 66. In such embodiments, the wing-to-wing fold joints 66 may be described as the "outermost" fold joints or rotational joints of the spray implement 22, as measured along the longitudinal or pitch axis 44 in either direction moving outwardly from the centerframe assembly 52.

The wing-to-wing fold joints 66 permit rotation of the outer wings 64 relative to the inner wings 64 about parallel rotational axes or hinge lines. These fold axes are schematically represented in FIG. 2 by symbols 74 and are referred to below as "wing-to-wing fold axes 74" or simply "fold axes 74." The wing-to-wing fold axes 74 extend principally in horizontal directions when the folding spray implement 22 resides in the deployed position shown in FIGS. 1 and 2. As appearing throughout this document, the phrase "extending principally in horizontal directions" is defined in a relative sense to indicate the hinge lines or fold axes of the identified fold joints (here, the fold joints 74) are more closely aligned with a horizontal plane than with a vertical plane. Additionally, the term "vertical plane" refers to a plane containing (or extending parallel to) the pitch and yaw axes of a folding spray implement; e.g., with reference to the example folding spray implement 22 shown in FIGS. 1 and 2, a plane containing the pitch and yaw axes 44, 50 of the spray implement 22 or an X-Y plane of the coordinate legend 46. In contrast, the term the term "horizontal plane" refers to a plane containing or extending parallel to the pitch and roll axes of a folding spray implement; e.g., in the case of the example spray implement 22, a plane containing the pitch and roll axes 44, 48 or an X-Z plane of the coordinate legend 46. Finally, the phrase "extending principally in vertical directions," as appearing herein, refers to hinge lines or fold axes of identified hinge joints that are more closely aligned with a horizontal plane than with a vertical plane.

The boom assemblies 42 are joined to opposing sides of the centerframe assembly 52 and extend therefrom in opposing directions when the folding spray implement 22 resides in the deployed position. The boom assemblies 42 are joined to the opposing sides of the centerframe assembly 52 by wing-to-frame fold joints 76. The wing-to-frame fold joints 76 permit rotation of the inner wings 62 relative to the centerframe assembly 52 about two parallel axes or hinge lines, referred to below as the "wing-to-frame fold axes 78." While not shown in FIGS. 1 and 2 for illustrative clarity, the wing-to-frame fold axes 78 are represented by double-headed arrows 76 in FIGS. 4 and 5 (described below). In certain embodiments, the joint structure or coupling at the interface between the centerframe assembly 52 and the inner wings 62 may also permit limited movement of the inner wings 62 in other DOFs; e.g., the joint structure may permit pivoting of the inner wings 62 about axes perpendicular to the fold axes 78 in some implementation. Such additional freedom of movement is unnecessary in carrying-out the below-described folding and unfolding scheme of the example spray implement 22 and will thus not be further described.

In contrast to the wing-to-wing fold axes 74, the wing-to-frame fold axes 78 extend principally in vertical directions when the folding spray implement 22 resides in the deployed position (FIGS. 1 and 2). Further, in certain implementations, the orientation of the wing-to-frame fold axes 78 may be angularly offset from the wing-to-wing fold axes 74 by approximately 90 degrees, taken about the longitudinal or pitch axis 44 of the folding spray implement 22. In other instances, the angular offset between these sets of axes may be greater than or less than 90 degrees. Further, in still other implementations, the wing-to-frame fold axes 78 may extend substantially parallel to the yaw axis 50 of the folding spray implement 22 (and, therefore, extend substantially parallel to a vertical plane) when the spray implement 22 resides in the stowed position, as discussed more fully below in connection with FIG. 3. Concurrently, the wing-to-wing fold axes 74 may extend substantially parallel to the roll axis 48 (and, therefore, be substantially parallel to a horizontal plane) when the folding spray implement 22 resides in the deployed position, as further discussed below in connection with FIG. 12.

As schematically illustrated in FIG. 2, the example folding spray implement 22 further contains an actuation system 80. The actuation system 80 can be hydraulic, pneumatic, and/or electrical in nature; and, generally, can assume any form suitable for transitioning the folding spray implement 22 between stowed and deployed positions in accordance with operator commands. In the illustrated example, specifically, the actuation system 80 includes a hydraulic fluid supply system 82 and a controller 84 operably coupled to the supply system 82 (indicated by arrow 86). During operation, the hydraulic fluid supply system 82 exchanges pressurized hydraulic fluid with a number of hydraulic cylinders 88, 90, 92, with the conduit connections further represented in FIG. 2 by double-headed arrows 94. The hydraulic cylinders 88, 90, 92 include at least one tilt or lift cylinder 88, two frame-to-wing fold cylinders 90, and two wing-to-wing fold cylinders 92. The wing-to-wing fold cylinders 92 are shown as spatially offset from the wing-to-wing fold joints 66 for illustrative clarity in FIG. 2, with the mechanical connection between the infrastructure of the fold joints 66 and the cylinders 92 denoted by dashed lines 96.

As depicted in FIG. 2, the controller 84 of the actuation system 80 can assume any form suitable for performing the functions described herein, with the term "controller" utilized in a non-limiting sense to generally refer to the processing and control architecture associated with the folding spray implement 22. Accordingly, the controller 84 can encompass or may be associated with one or more processors, computer-readable memories, power supplies, storage devices, interface cards, and other standardized components. The controller 84 may also include or cooperate with any number of firmware and software programs or computer-readable instructions designed to carry-out the various process tasks, calculations, and control functions described herein.

As recently mentioned, the actuation system 80 selectively transitions the folding spray implement 22 between stowed and deployed positions in accordance with operator commands. In so doing, the actuation system 80 progresses the folding spray implement 22 through a sequence of controlled motions when unfolding the spray implement 22 into the deployed position or, conversely, when returning the spray implement to the stowed position from the deployed position. In either instance, the actuation system 80 temporarily places the folding spray implement 22 in an intermediate unfolded position in which the fold axes 74 of the wing-to-wing fold joints 66 extend principally in vertical (rather than horizontal) directions. This permits the actuation system 80 to fold and unfold the boom assemblies 42, as the case may be, while the outer wings 64 (and the breakaway segments 68, if present) rotate about the fold axes 74 in plane more closely aligned with (and perhaps coplanar with) a horizontal plane than with a vertical plane. The peak fold height of the folding spray implement 22 is minimized as a result. Further, in instances in which the outer wings 64 rotate in a plane coplanar with or substantially parallel to a horizontal plane, the peak fold height of the folding spray implement 22 is largely decoupled from or rendered independent of the wingspan of the spray implement 22. This, in turn, enables the folding spray implement 22 to be imparted with a relatively broad wingspan and a minimal peak fold height, while minimizing the number of wings and wing-to-wing fold joints contained in the spray implement 22.

One manner in which the actuation system 80 may progress the folding pray implement 22 through a sequence of motions when transitioning the implement from a stowed position to a deployed position will now be described with reference to FIGS. 3-12. In these drawing figures, the bulk of the self-propelled sprayer 20 is hidden from view to avoid visually obstructing portions of the folding spray implement 22, while the chassis 24 and the wheels 26 of the sprayer 20 are shown to provide a frame of reference. The folding spray implement 22 and the sprayer 20 may assume various other forms in further embodiments, with FIGS. 3-12 illustrating but one of many possible physical implementations of the folding spray implement 22 and the self-propelled sprayer 20, generally.

Figure 3:
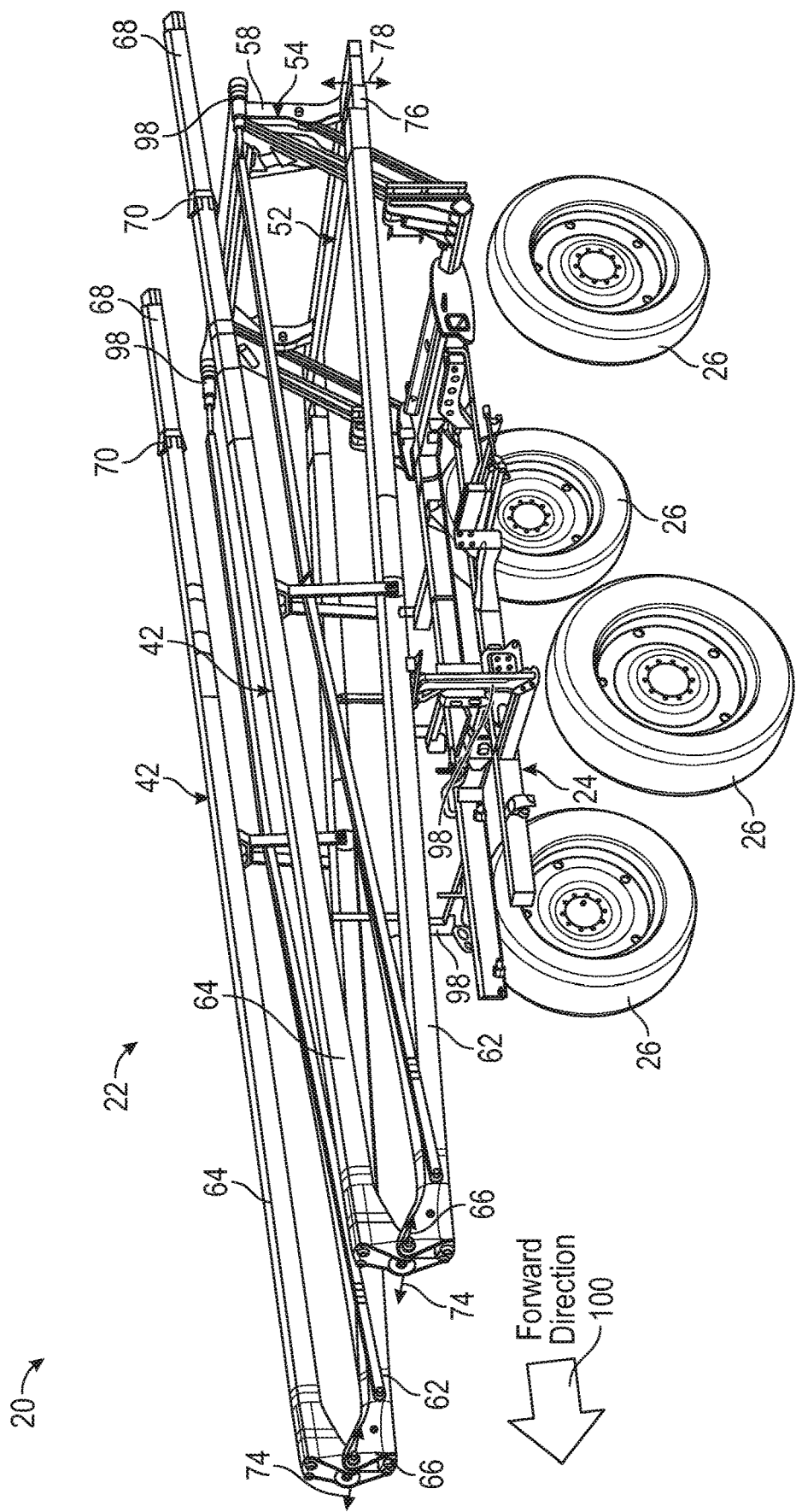
FIG. 3 is an isometric view of the chassis of the work vehicle shown in FIG. 1, the tires of the work vehicle, and the folding spray implement in a stowed (folded) position.

Referring initially to FIG. 3, the folding spray implement 22 is shown in a stowed position in which the boom assemblies 42 extend adjacent and alongside opposing sides of the sprayer chassis 24. For spatial context, an arrow 100 indicates the forward direction in which the self-propelled sprayer 20 moves when traveling over a crop field, roadway, or other surface. In the illustrated example, the self-propelled sprayer 20 further includes a number of support posts or cradles 98. The boom assemblies 42 rest on the cradles 98 when the spray implement 22 resides in the stowed position. The provision of cradles 98 thus unloads the centerframe assembly 52 and the spray implement actuators (the cylinders 88, 90, 92), and may include brackets or the like helping retain the boom assemblies 42 in their desired position during transport. As can be seen, the folding spray implement 22 is imparted with a relatively narrow width (as measured across the sprayer 20) when folded into its stowed state or position. This facilitates navigation of the self-propelled sprayer 20 on public roadways or otherwise enables movement of the sprayer 20 with greater ease.

Figure 4:
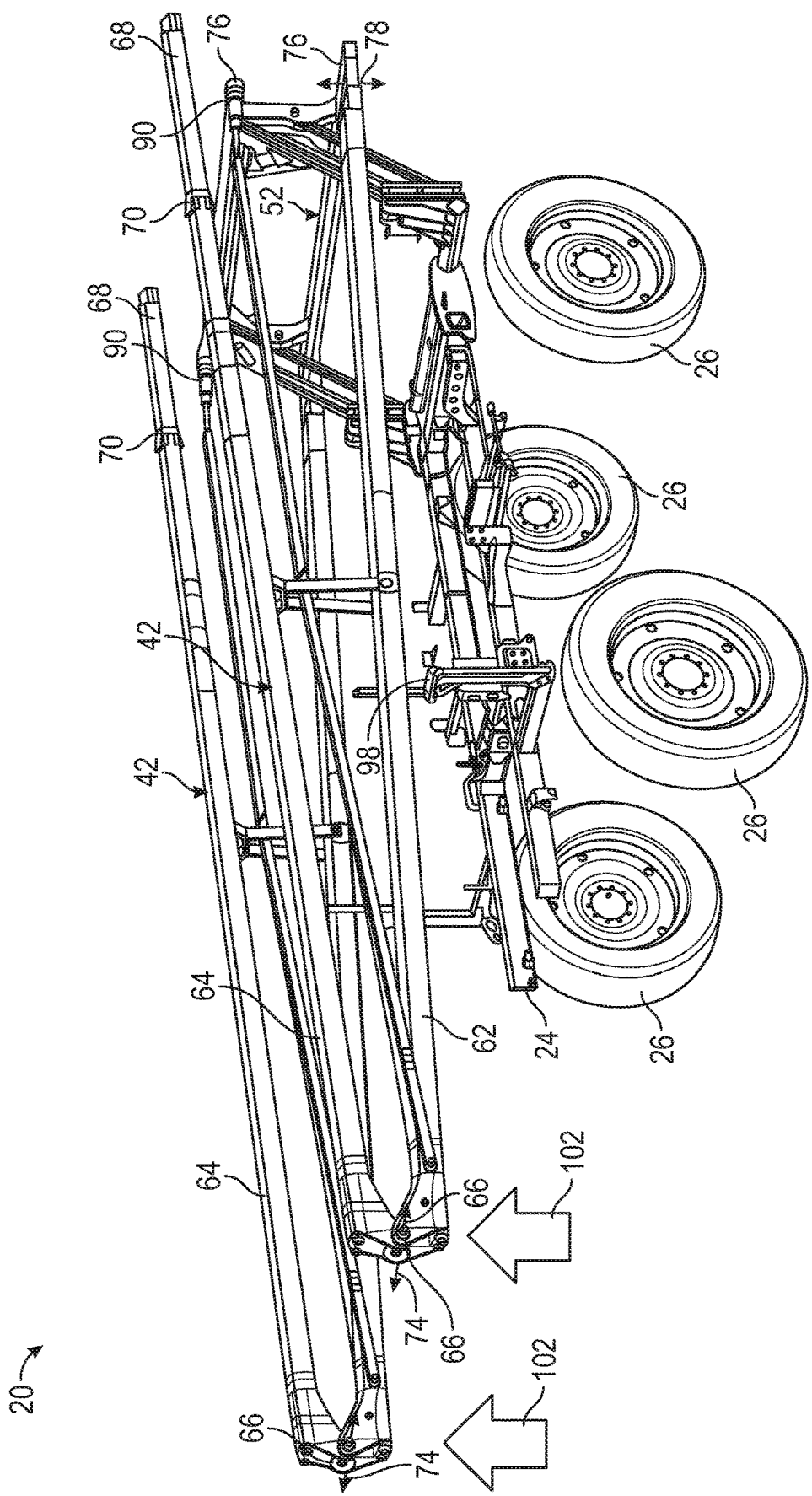
FIGS. 4-12 are isometric views of the chassis of the work vehicle and the example folding spray implement, shown from various viewpoints and illustrating sequential stages of movement as the spray implement transitions from the stowed position (FIG. 3), through an intermediate unfolded position (FIG. 9), and to a fully deployed position (FIG. 12)
Figure 5:
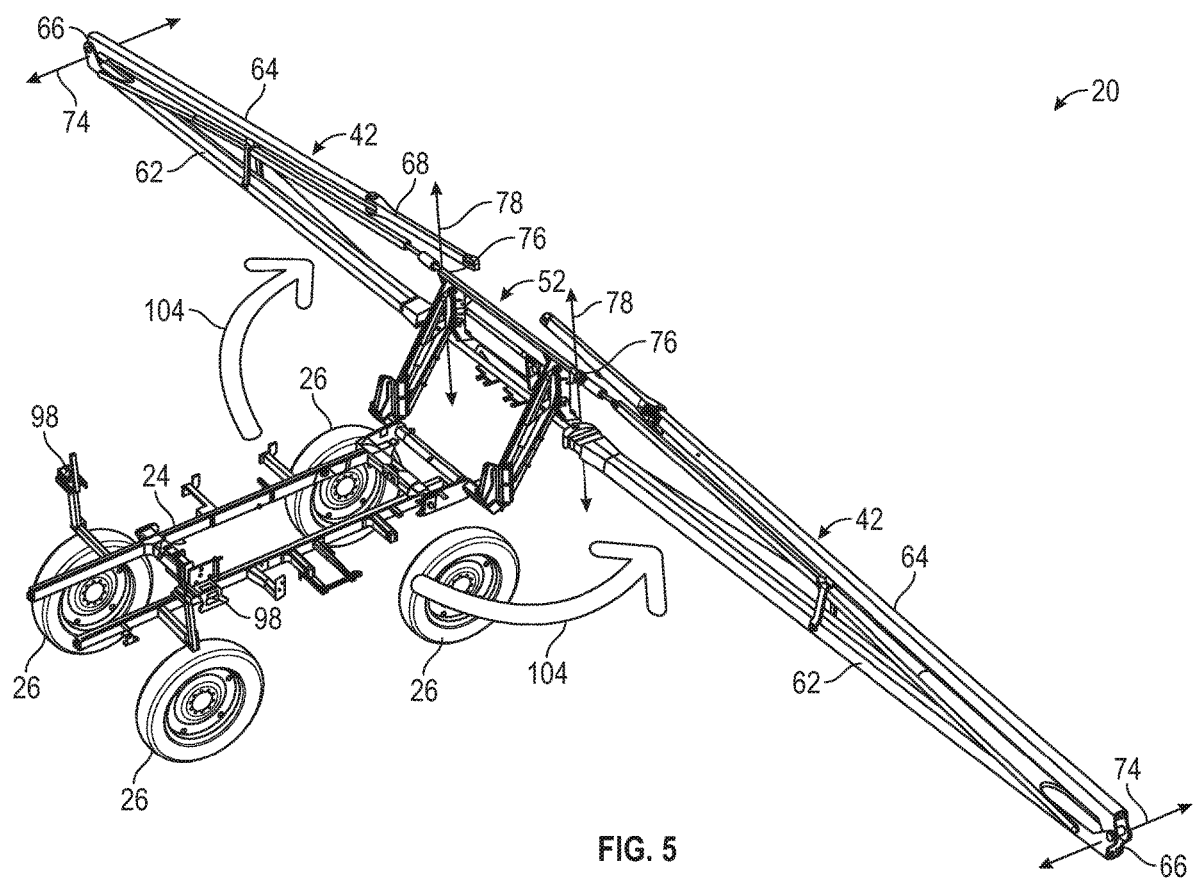
Figure 6:
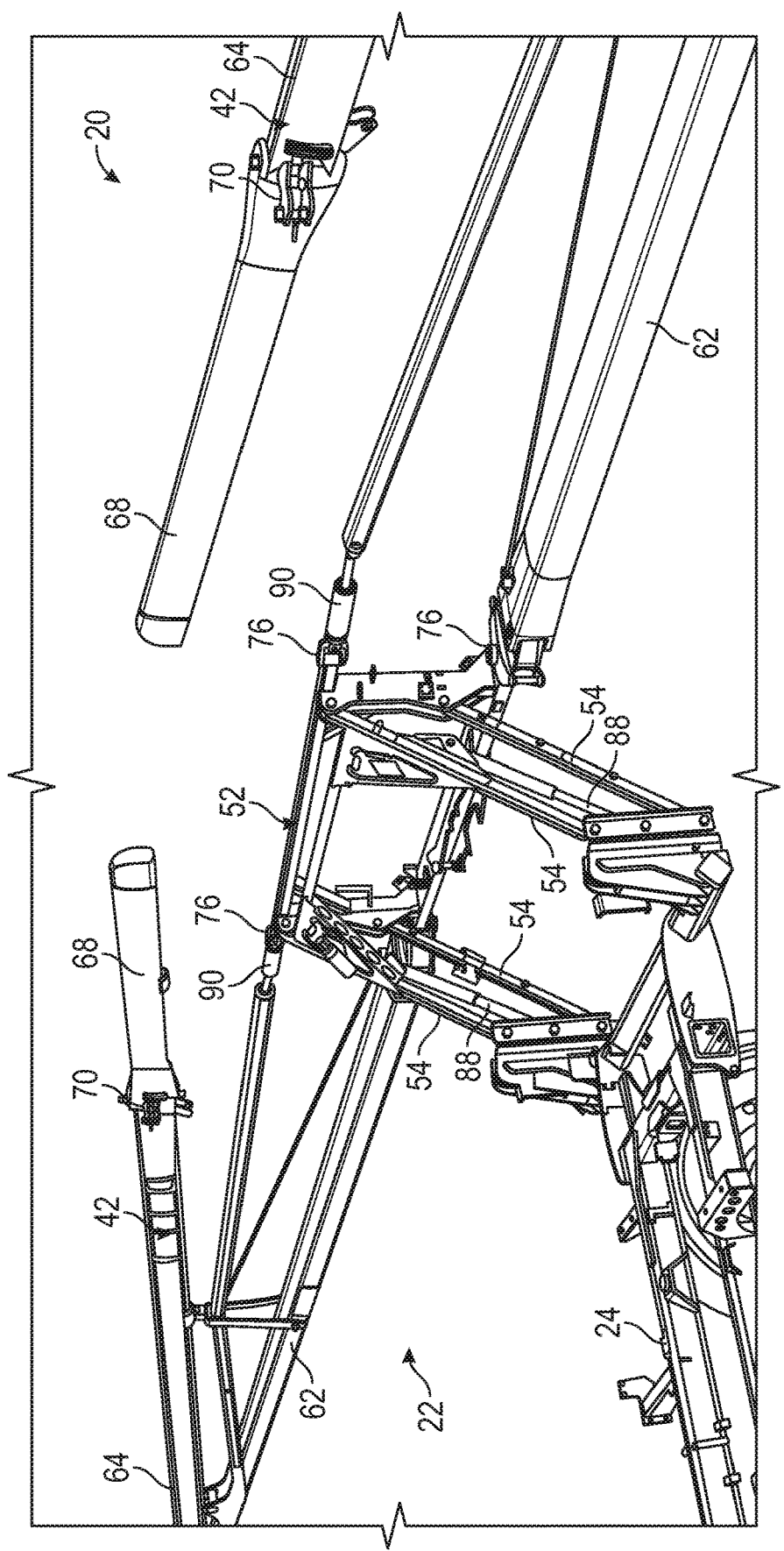
Figure 12:
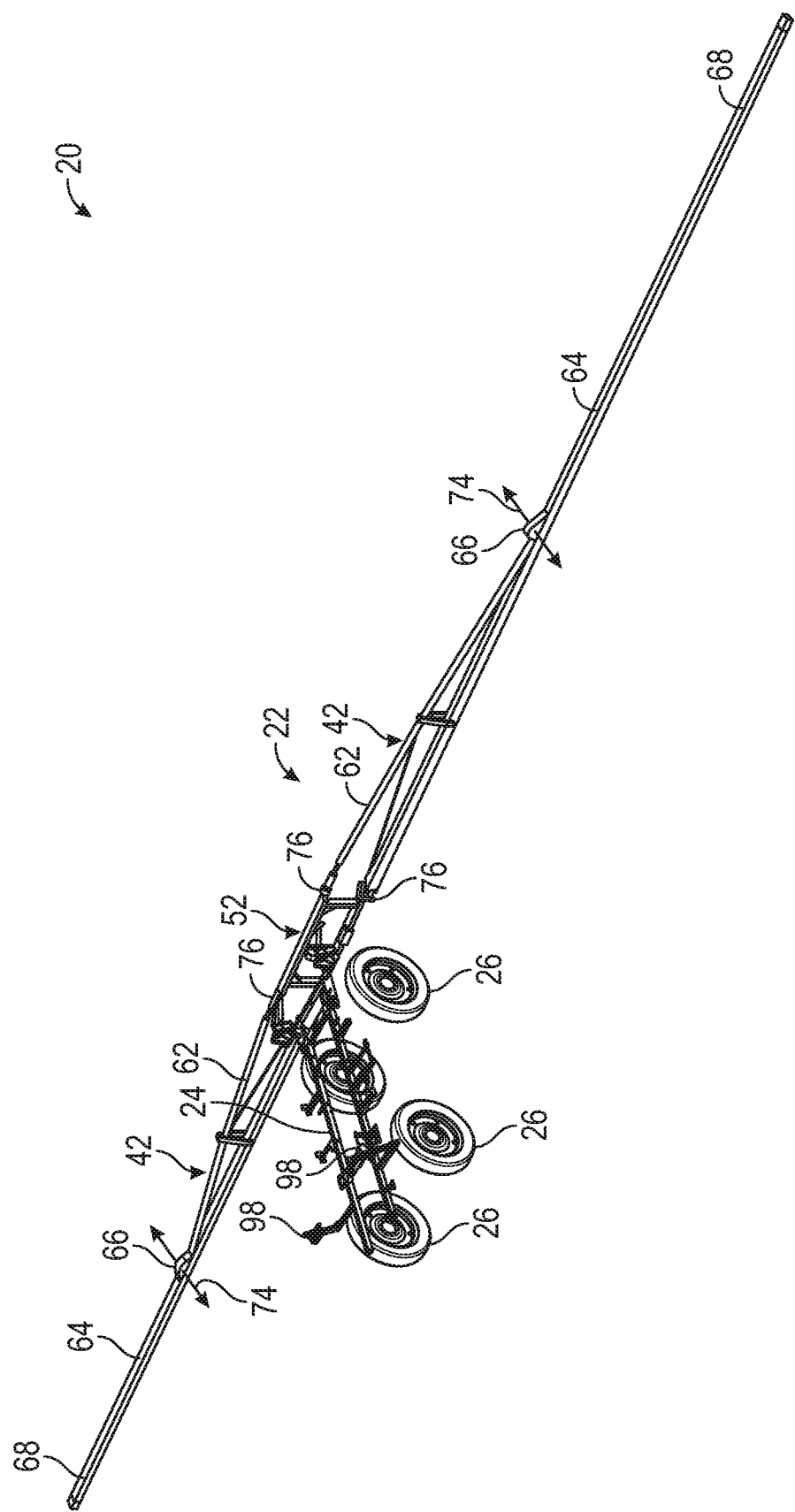

Prior to usage of the folding spray implement 22 in distributing a spray solution or other sprayable material over a crop field, an operator seated within the cabin 30 commands the spray implement 22 to transition from the stowed position (FIG. 3) into the fully deployed position shown in FIG. 12 (described below). When so commanded, the actuation system 80, and specifically the controller 84 (FIG. 2), moves the spray implement 22 through a predetermined sequence of motions. Commencing the transition toward the deployed position (FIG. 1), the actuation system 80 first rotates the folding spray implement 22 such that the boom assemblies 42 and, more specifically, the inner wings 62 lift from the cradles 98. This stage of motion is indicated in FIG. 4 by arrows 102. After the inner wings 62 have lifted sufficiently from the cradles 98, the controller 84 of the actuation system 80 then extend the frame-to-wing cylinders 90 in a manner rotating the boom assemblies 42 about the fold axes 78 of the wing-to-frame fold joints 76 relative to the centerframe assembly 52. In response to the extension of the frame-to-wing cylinders 90, the boom assemblies 42 swing outwardly from the chassis 24 of the self-propelled sprayer 20, as indicated in FIG. 5 by arrows 104. In the illustrated example, the boom assemblies 42 rotate by approximately 90 degrees to shift from the stowed orientation (in which the boom assemblies 42 extend substantially parallel to the longitudinal axis or centerline of the sprayer chassis 24) to an orientation in which the assemblies 42 extend substantially perpendicular to the sprayer chassis 24, with the chassis 24 and the boom assemblies 42 collectively forming a T-shape.

Figure 7:
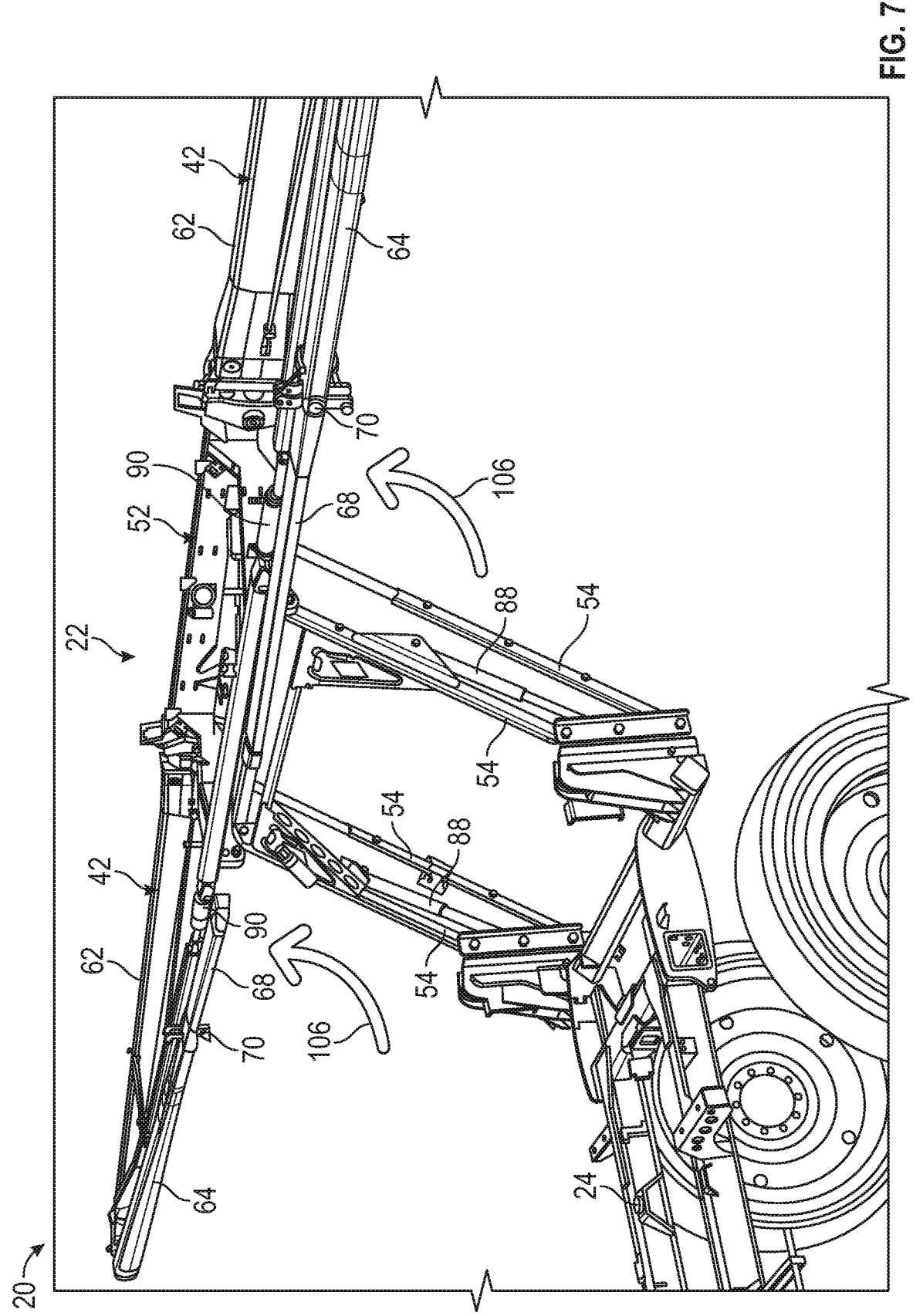

After the inner wings 62 swing outwardly from the chassis 24 of the self-propelled sprayer 20, the controller 84 of the actuation system 80 commands the tilt cylinder 88 to rotate the centerframe assembly 52 such that a lower edge of the assembly rotates or swings outwardly away from the chassis 24 of the sprayer 20. This causes rotation of the centerframe assembly 52 and the boom assemblies 44 about the longitudinal or pitch axis 44 of the spray implement 20 in a first rotational direction by a predetermined angular displacement of, for example, approximately 90 degrees. The centerframe assembly 52, and therefore the boom assemblies 42, are rotated by a sufficient angular displacement to position the wing-to-wing fold joints 66 in an orientation in which the fold axes 74 of the wing-to-wing fold joints 66 extend principally in vertical directions. This may be appreciated by comparing FIG. 6 (a close-up perspective view of a central portion of the folding spray implement 22 prior to this movement) to FIG. 7 (a close-up perspective view of a central portion of the folding spray implement 22 after this movement). Arrows 106 in FIG. 7 indicate the manner in which the centerframe assembly 52 is rotated relative to the chassis 24 of the sprayer 20 to place the fold axes 74 of the wing-to-wing fold joints 66 in an orientation extending principally in vertical directions. In the illustrated example, the wing-to-wing fold axes 74 are rotated into an orientation extending substantially parallel to the yaw axis 50 (FIG. 2) of the folding spray implement 22. Given the generally rectangular formfactor of the centerframe assembly 52, this may also be described as rotating the centerframe assembly 52 from an upright, vertical orientation (FIG. 6) into a titled, horizontal or "flat" orientation (FIG. 7).

Figure 8:
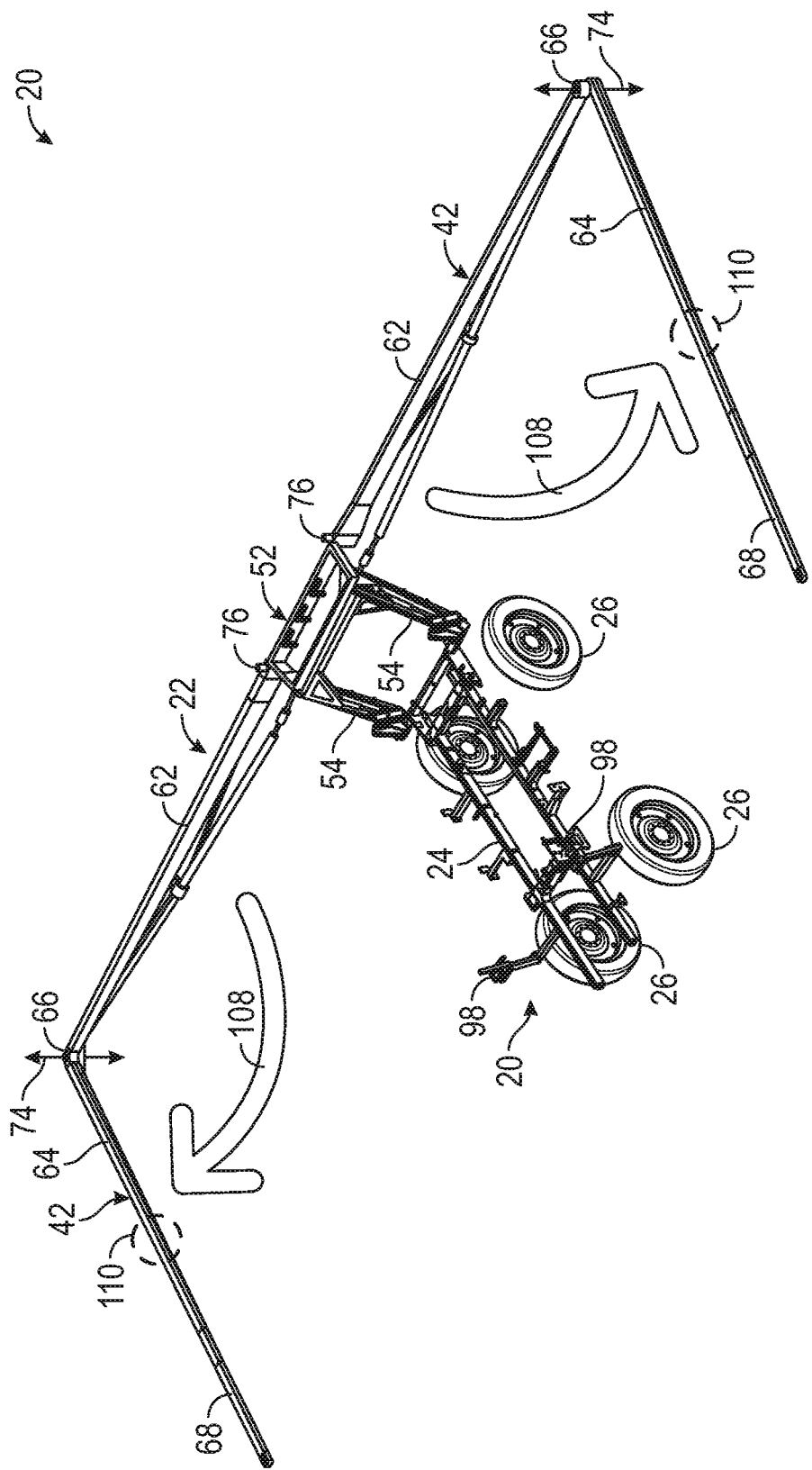

The controller 84 of the actuation system 80 next commands the wing-to-wing fold cylinders 92 to extend in a manner rotating the inner wings 62 relative to the inner wings 62 about the fold axes 74 of the wing-to-wing fold joints 66. As the wing-to-wing fold cylinders 92 extend, the outer ends of the inner wings 62 and the breakaway segments swing outwardly away from the chassis 24 of the self-propelled sprayer 20 to unfold the boom assemblies 42. This motion is illustrated in FIG. 8, in which arrows 108 denote the rotation of the outer wings 64 relative to the inner wings 62 about the wing-towing fold axes 74. When this motion stage is complete, the full wingspan of the folding spray implement 22 is realized, bringing the spray implement 22 to the unfolded intermediate position shown in FIG.

Figure 9:
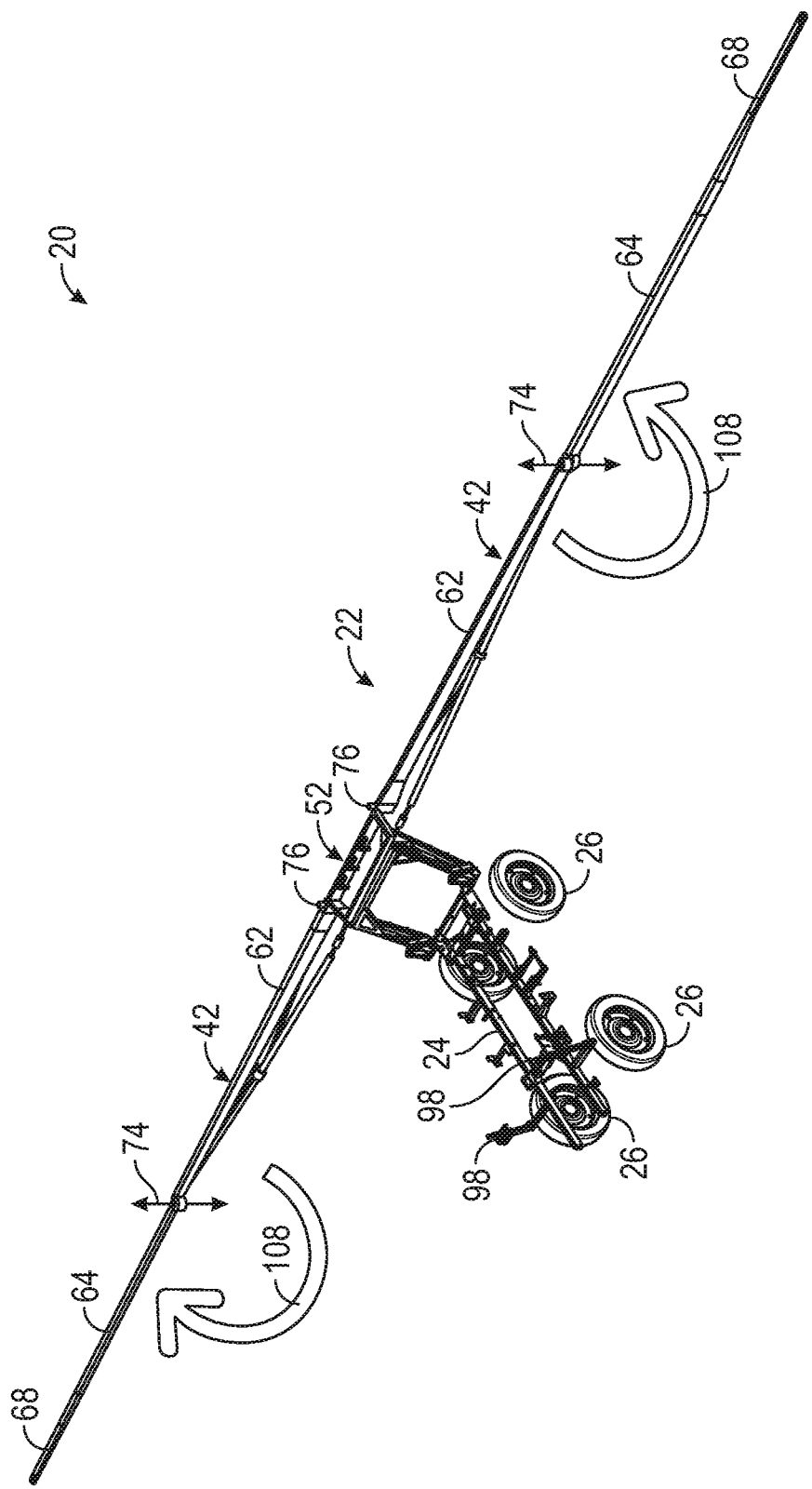

9. Rotation of the inner wings 62 about the wing-to-wing fold joints 66 may occur over a 180 degree range of motion in embodiments, with the inner wings 62 moved into a position substantially co-axial with the outer wings 64 upon completion of this motion and arrival into the unfolded intermediate position (FIG. 9).

Due to the orientation of the wing-to-wing fold joints 66, the outer wings 64 unfold away from the inner wings 62 in a plane more closely angularly aligned with a horizontal plane than with a vertical plane. Indeed, in the illustrated example, the inner wings 62 (and the breakaway segments 68) rotate in a plane substantially parallel to, if not coplanar with a horizontal plane. Consequently, the inner wings 62 and the outer wings 64 can be imparted with any practical length, as measured along the longitudinal axis 44 of the spray implement 22, with little to no impact on the peak fold height of the folding spray implement 22. A number of benefits are realized as a result. First, the folding spray implement 22 may be imparted with a relatively expansive wingspan when unfolded, while minimizing the peak fold height of the spray implement 22. In this regard, in various embodiments, the folding spray implement 22 may have a wingspan exceeding 30 meters when unfolded, while having a peak fold height less than 4 meters. In other embodiments, the wingspan of the folding spray implement 22 may be less than then the aforementioned threshold and/or the peak fold height of the spray implement 22 may be greater than the aforementioned threshold.

As a second, related benefit, the folding spray implement 22 achieves such a low peak fold height-to-wingspan ratio, while minimize the number of wing-to-wing fold joints located along the respective lengths of the boom assemblies 42. Thus, as indicated in the present example, the folding spray implement 22 may be imparted with a relatively broad (>30 meter) wingspan with each boom assembly 42 including a single wing-to-wing fold joint 66. Certain conventional solutions to obtaining low peak fold height-to-wingspan ratios involve the introduction of additional fold joints along the length of boom assemblies 42 in, for example, the circled regions 110 identified in FIG. 8. Through the elimination of such additional fold joints and associated hardware (e.g., fold actuators), the overall weight, cost, and complexity of the folding spray implement 22 can be reduced. The moment forces acting about the wing-to-wing fold joints 66 (and upon other boom assembly regions) as the folding spray implement 22 transitions between stowed and deployed positions are lessened, thereby mitigating structural reinforcement issues (e.g., permitting the usage of support members lacking or having reduced localized wall thickening) and allowing down-sizing of the fold actuators (e.g., the wing-to-wing fold cylinders 92), if so desired. In such embodiments in which additional fold joints outboard of the fold joints 66 are absent from the spray implement 22, the wing-to-wing fold joints 66 may be described as the "outermost" fold joints of the spray implement 22, as previously indicated.

The respective lengths of the outer wings 64 (and perhaps the inner wings 62) may also be increased relative to conventional folding spray implements to achieve the desired wingspan of the folding spray implement 22 when in its unfolded, deployed position. Accordingly, in embodiments in which the inner wings 62 are each imparted with a first length ($L_1$) taken along the longitudinal axis 44 of the spray implement 22, the outer wings 64 are each imparted with a second length ($L_2$) along the longitudinal axis 44, the inner and outer wings 64, 66 may be dimensioned such that the second length ranges is greater than ½ the first length and less the first length; that is, such that $L_1 > L_2 > 0.5(L_1)$. Additionally or alternatively, $L_1$ may range from about 8 meters to about 12 meters in embodiments, while $L_2$ ranges from about 3 meters to about 7 meters. In other embodiments, $L_1$ and $L_2$ may be greater than or less than the aforementioned ranges. Finally, in embodiments in which the cumulative length of each outer wing 64 its the connected breakaway segment 68 is imparted with a third length ($L_3$) (again, as taken along the longitudinal axis 44 of the folding spray implement 22), the third length may be substantially equivalent to or differ from the first length by less than a meter such that $L_3 = L_1 \pm 1$ meter. In still other embodiments, $L_3$ may range from about 7 meters to about 12 meters.

Figure 10:
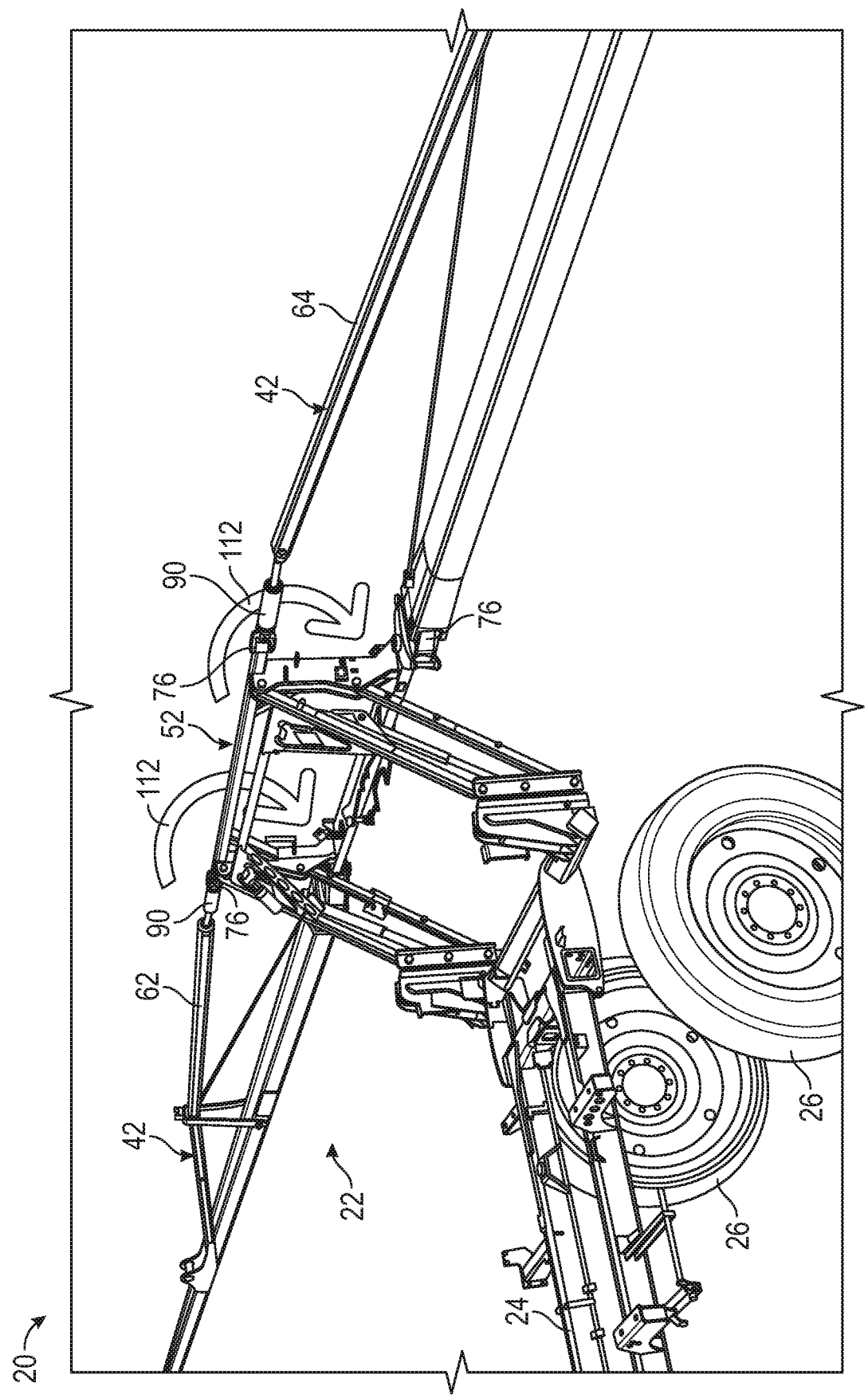
Figure 11:
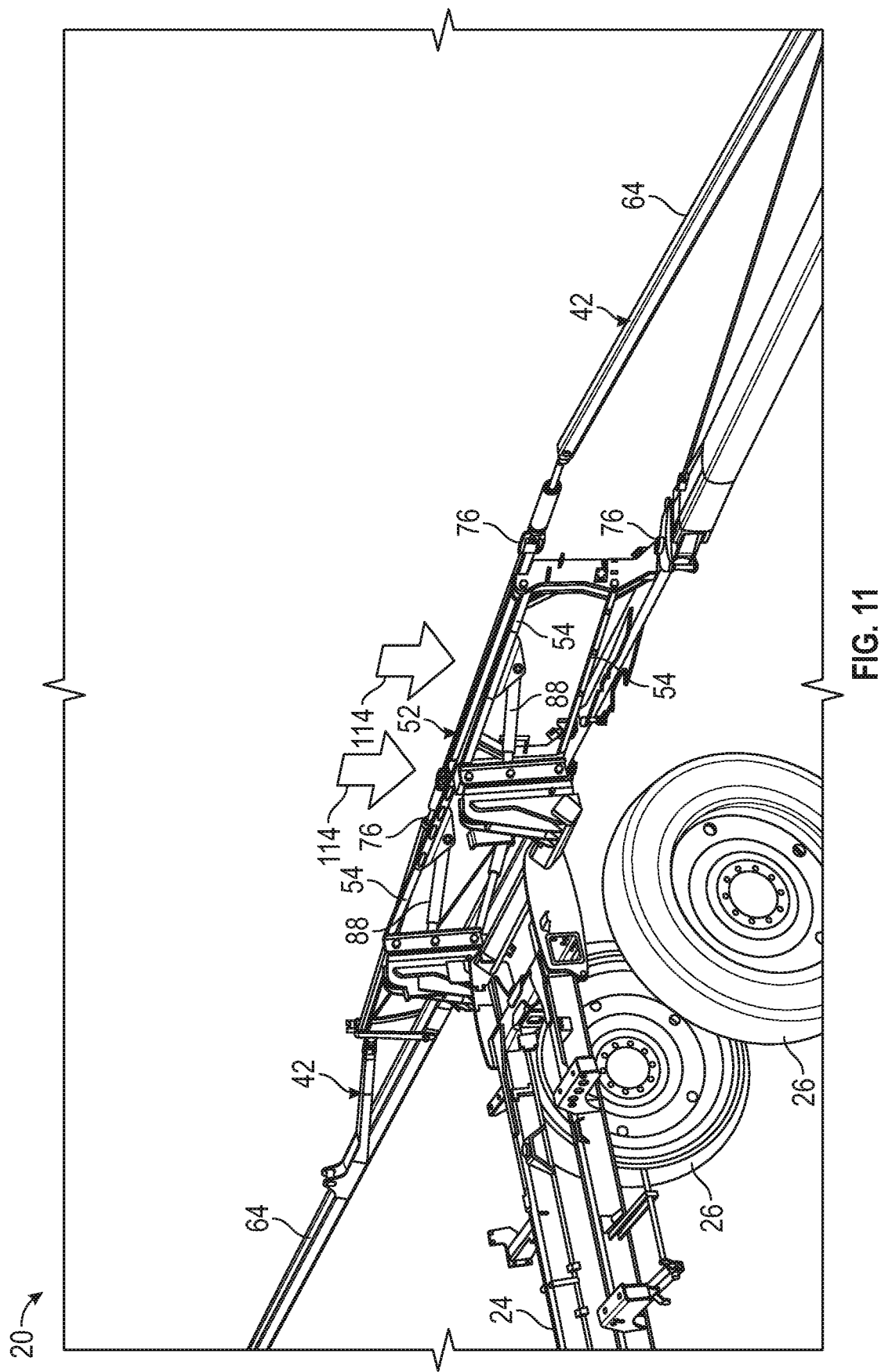

After placing the folding spray implement 22 in the intermediate unfolded position (FIG. 9), the controller 84 of the actuation system 80 continues to progress the spray implement 22 toward its fully deployed position. Several stages of motion occur in moving the spray implement 22 from the intermediate unfolded position (FIG. 9) to the fully deployed position (FIG. 12). First, as shown in FIG. 10, the controller 84 of the actuation system 80 commands the tilt or lift cylinders 88 to rotate or pitch the lower edge of the centerframe assembly 52 downwardly to return the wing-to-wing fold joints 66 to an orientation in which the fold axes 74 of the wing-to-wing fold joints 66 extend principally in horizontal directions. This motion, represented in FIG. 10 by arrows 112, returns the centerframe assembly 52 to its upright or vertical orientation. Finally, as indicated FIG. 11 by arrows 114, the folding spray implement 22 is vertically lowered relative to the sprayer chassis 24. This brings the folding spray implement 22 to the fully unfolded, deployed position shown in FIG. 12. The folding spray implement 22 is now ready for usage in distributing a spray solution or other spray material over a crop field, such as that shown in FIG. 1.

When the folding spray implement 22 is commanded to return to the stowed position by an operator of the sprayer 20, the actuation system 80 performs the above-described motion steps in reverse order. Briefly stated, the actuation system 80 moves the folding spray implement 22 through the following motion stages: (i) the folding spray implement 22 is vertically raised (opposite motion arrows 114 in FIG. 11), (ii) the centerframe assembly 52 is rotated upwardly (opposite motions arrows 112 in FIG. 10), (iii) the boom assemblies 42 are folded in upon themselves (opposite motions arrows 108 in FIGS. 8 and 9), (iv) the centerframe assembly 52 is rotated downwardly (opposite motions arrows 106 in FIG. 7), (v) the boom assemblies 42 are rotated or swung inwardly toward the chassis 24 of the sprayer 20 (opposite motion arrows 104 in FIG. 5), and (vi) the boom assemblies 42 are then further rotated to lower the inner wings 62 onto the cradles 98 (opposite motion arrows 102). This returns the folding spray implement 22 to the stowed, transport position shown in FIG. 3.

The foregoing has thus provided an example embodiment of a folding spray implement (the spray implement 22) having a relatively low peak fold height-to-wingspan ratio. In the above-described example embodiment, the centerframe assembly 52 of the folding spray implement 22 is imparted with a fixed configuration and, thus, includes a single fixed centerframe structure 56 to which the boom assemblies 42 pivotally connect. In further embodiments, the centerframe assembly 52 may be imparted with a different design or configuration, such as a suspended configuration; and, more generally, the overall construction of the folding spray implement 22 can differ to varying extents. Further emphasizing this point, FIG. 13 schematically illustrates a second example embodiment of a folding spray implement 116 (partially shown) including a centerframe assembly 118 having a suspended configuration. The suspended centerframe assembly 118 of the example folding spray implement 116 is described in greater detail below; first, however, the other components of the spray implement 116 are discussed to establish a context in which the suspended centerframe assembly 118 may be better understood.

Figure 13:
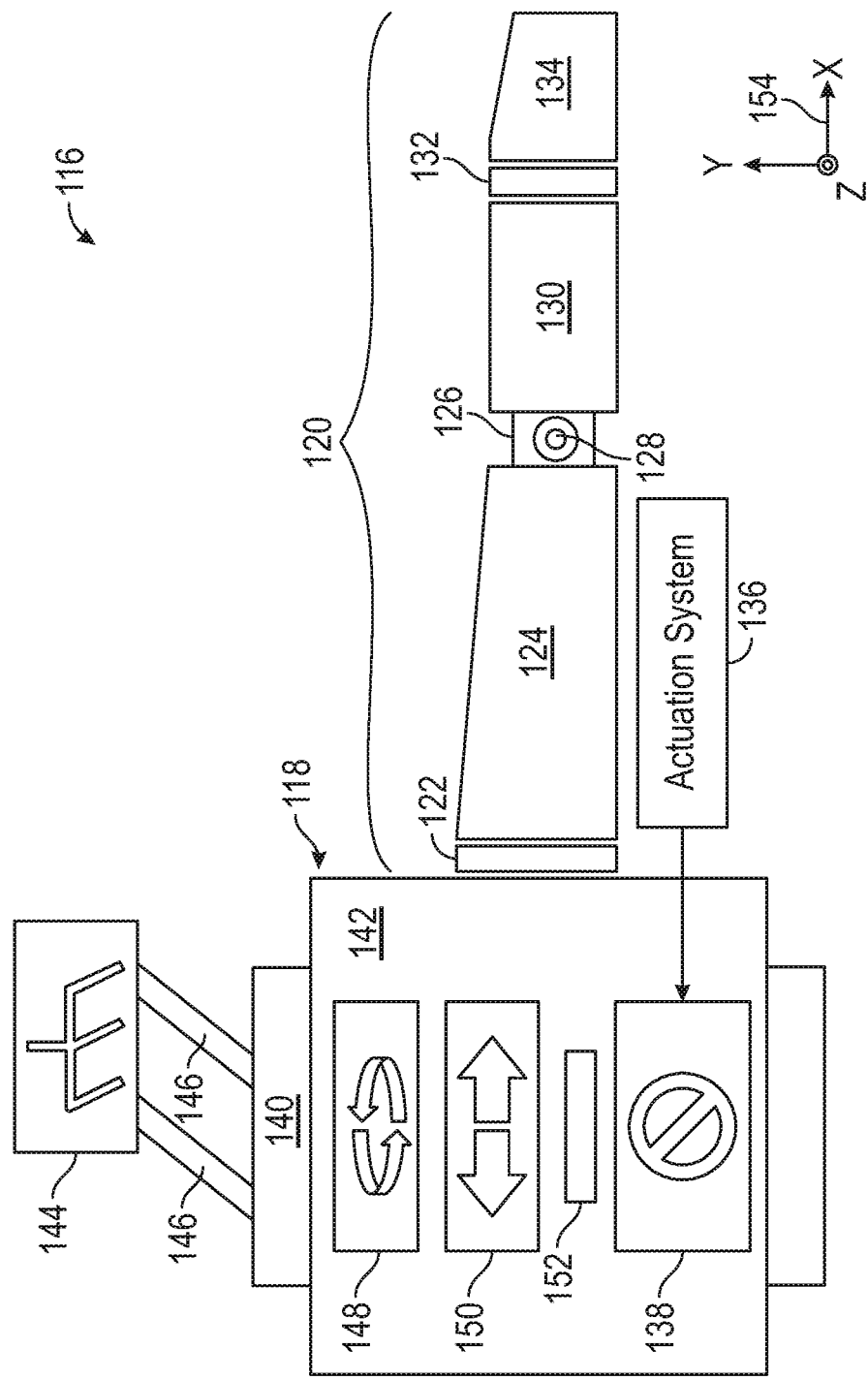
FIG. 13 is a schematic of a folding spray implement (partially shown) similar to the example folding spray implement schematically shown in FIG. 2, but further having a suspended centerframe configuration and a centerframe motion lock selectively engaged by an actuation system when transitioning the spray implement between the stowed and deployed positions, as illustrated in accordance with a further example embodiment.

Aside from the suspended centerframe assembly 118, the components of the folding spray implement 116 may be similar or substantially identical to the components of the above-described folding spray implement 22 (FIGS. 1-12). The foregoing description is thus equally applicable to the folding spray implement 116 and is imported to describe the spray implement 116, including those components not shown in FIG. 13 for clarity (e.g., fold cylinders, a spray material delivery system, etc.). In the illustrated example, the folding spray implement 116 includes two boom assemblies 120, only one of which is shown in FIG. 13. Moving outwardly from the suspended centerframe assembly 118, each boom assembly 120 includes a wing-to-frame fold joint 122 permitting rotation about a frame-to-wing fold axis, an inner wing 124, a wing-to-wing fold joint 126 permitting rotation about a wing-to-wing fold axis 128, an outer wing 130, a breakaway mechanism 132, and an outer breakaway segment 134. Once again, an actuation system 136 is provided and is analogous to actuation system 80 shown in FIG. 2, while further including an operative connection to a centerframe motion lock 138 contained in the suspended centerframe assembly 118 (described below).

Turning now to the centerframe assembly 118, the suspended centerframe assembly 118 includes at least two centerframes: a fixed centerframe 140, and a suspended centerframe 142. As was previously the case, the fixed centerframe 140 is joined to a chassis 144 of a work vehicle (e.g., a self-propelled sprayer) via a number of bar links 146. Comparatively, the suspended centerframe 142 is joined to the fixed centerframe 140 in a manner permitting motion of the suspended centerframe 142 relative to the fixed centerframe 140 in one or more DOFs. The boom assemblies 120 are joined to opposing sides of the suspended centerframe 142 and, therefore, likewise move along with the suspended centerframe 142 relative to the fixed centerframe 140 and work vehicle chassis 144. As schematically indicated in FIG. 13, mechanical coupling(s) between the fixed centerframe 140 and the suspended centerframe 142 may provide an extra roll suspension 148, yaw suspension 150, and an extra yaw suspension 152. Referring to coordinate legend 154 appearing in the lower right of FIG. 13, the roll suspension 148 permits movement of the suspended centerframe 142 relative to the fixed centerframe 140 about the roll axis of the folding spray implement 116 (parallel to the X-axis of legend 154). Similarly, the yaw suspensions 150, 152 permit movement of the suspended centerframe 142 relative to the fixed centerframe 140 about the yaw axis of the spray implement 116 (parallel to the Y-axis of legend 154).

When engaged by the actuation system 136, the centerframe motion lock 138 prevents or largely deters movement of the suspended centerframe 142 relative to the fixed centerframe 140. At some juncture prior to rotation of the centerframe assembly 118 such that the wing-to-wing axes 128 of the boom assemblies 120 extend principally in vertical directions, the actuation system 136 temporarily engages the motion lock 138 to prevent undesired movement of the suspended centerframe 142 and the boom assemblies 120 relative to the fixed centerframe 140 and the vehicle chassis 144. More specifically, and referring briefly again to FIGS. 2-12, the actuation system 136 may engage the motion lock 138 after receiving operator commands to transition the folding spray implement 116 from a stowed to a deployed position and prior to rotating the centerframe assembly 118 in a manner analogous to that shown in FIG. 7. Subsequently, the actuation system 136 disengages the centerframe motion lock 138 prior to usage of the folding spray implement 116 to enable the desired suspension effect between the centerframes 140, 142; e.g., in one approach, the actuation system 136 may disengage the motion lock 138 immediately before or immediately following arrival of the spray implement 116 into the fully deployed position analogous to that shown in FIG. 12. In this manner, embodiments of the folding spray implement having more complex suspension schemes can be realized, while still imparting the folding spray implement with a relatively low peak fold height-to-wingspan ratio, as previously described.

Enumerated Examples of the Cooling and Debris Mitigation System

The following examples of the cooling debris and mitigation system are further provided and numbered for ease of reference.

1. A folding spray implement including a centerframe assembly, boom assemblies mounted to opposing sides of the centerframe assembly, and an actuation system coupled to the centerframe assembly and to the boom assembly. The boom assemblies include, in turn, inner wings pivotally joined to the centerframe assembly for rotation about frame-to-wing fold joints, as well as outer wings pivotally joined to the inner wings for rotation about wing-to-wing fold joints. The actuation system configured to selectively transition the folding spray implement: (i) from a stowed position in which the wing-to-wing fold joints extend principally in horizontal directions; (ii) through an intermediate unfolded position in which the wing-to-wing fold joints extend principally in vertical directions; and (iii) to a deployed position in which the wing-to-wing fold joints extend principally in horizontal directions.

2. The folding spray implement of example 1, wherein fold axes of the frame-to-wing fold joints extend principally in vertical directions when the folding spray implement is in the stowed and deployed positions. The fold axes of the frame-to-wing fold joints further extend principally in horizontal directions when the folding spray implement is in the intermediate unfolded position.

3. The folding spray implement of example 1, wherein the folding spray implement has a roll axis and a yaw axis perpendicular to the roll axis. The fold axes of the wing-to-wing fold joints extend substantially parallel to the roll axis when the folding spray implement is in the stowed and deployed positions. Conversely, the fold axes of the wing-to-wing fold joints extend substantially parallel to the yaw axis when the folding spray implement is in the intermediate unfolded positions.

4. The folding spray implement of example 1, wherein the boom assemblies are folded when the folding spray implement is in the stowed position. Further, the actuation system, when transition the folding spray implement from the stowed position to the deployed position, causes the boom assemblies to unfold when the fold axes of the wing-to-wing fold joints extend principally in vertical directions.

5. The folding spray implement of example 1, wherein the wing-to-wing fold joints are the outermost fold joints of the folding spray implement, as taken along a longitudinal axis of the folding spray implement when in the deployed position.

6. The folding spray implement of example 1, wherein the inner wings each have a first length $L_1$, as taken along a longitudinal axis of the folding spray implement; wherein the outer wings each have a second length $L_2$, as taken along the longitudinal axis; and wherein $L_2>0.5(L_1)$.

7. The folding spray implement of example 1, wherein the centerframe assembly includes a fixed centerframe and suspended centerframe. The fixed centerframe is joined to a chassis of the agricultural work vehicle. Comparatively, the suspended centerframe mounted to the fixed frame and movable relative thereto in at least one degree of freedom (DOF), the boom assemblies mounted to opposing sides of the suspended centerframe.

8. The folding spray implement of example 7, further including a centerframe motion lock between the fixed centerframe and the suspended centerframe. The centerframe motion lock deters movement of the suspended centerframe relative to the fixed centerframe in the at least one DOF when the centerframe motion lock is engaged. The actuation system is configured to temporarily engage the centerframe motion lock when transitioning the folding spray implement between the stowed and deployed positions.

9. The folding spray implement of example 1, wherein, when transitioning the folding spray implement from the stowed position to the intermediate unfolded position, the actuation system moves the folding spray implement such that: (i) the boom assemblies swing outwardly from the chassis of the agricultural work vehicle by rotation about fold axes of the wing-to-frame fold joints; (ii) after the inner wings swing outwardly from the chassis, a lower edge of the centerframe assembly is rotated upwardly in a manner placing the wing-to-wing fold joints in an orientation in which the fold axes of the wing-to-wing fold joints extend principally in vertical directions; and (iii) the boom assemblies unfold by rotation of the outer wings relative to the inner wings about the fold axes of the wing-to-wing fold joints.

10. The folding spray implement of example 9, wherein the agricultural work vehicle further includes cradles on which the inner wings rest when in the stowed position. The actuation system lifts the inner wings from the cradles prior to causing the inner wings to swing outwardly from the chassis of the agricultural work vehicle.

11. The folding spray implement of example 9, wherein, when transitioning the folding spray implement from the intermediate unfolded position to the deployed position, the actuation system further moves the folding spray implement such that: (i) the lower edge of the centerframe assembly is rotated downwardly to return the wing-to-wing fold joints to an orientation in which the fold axes of the wing-to-wing fold joints extend principally in horizontal directions; and (ii) the folding spray implement is vertically lowered relative to a chassis of the agricultural work vehicle.

12. The folding spray implement of example 1, wherein the boom assemblies extend adjacent and substantially parallel to opposing sides of the vehicle chassis when the folding spray implement is in the stowed position.

13. The folding spray implement of example 1, wherein the actuation system further tilts the centerframe assembly about an axis parallel to a longitudinal axis of the folding spray implement (i) in a first rotational direction when transitioning the folding spray implement from the stowed position to the intermediate unfolded position, and (ii) in a second, opposing rotational direction when transitioning the folding spray implement from the intermediate position to the deployed position.

14. In further embodiments, the folding spray implement includes boom assemblies each containing wings pivotally joined at wing-to-wing fold joints. A centerframe assembly is mounted to a chassis of an agricultural work vehicle, with the boom assemblies joined to opposing sides of the centerframe assembly at frame-to-wing fold joints. An actuation system is coupled to the centerframe assembly and to the boom assemblies. The actuation system is configured to transition the folding spray implement between stowed and deployed positions in accordance with operator commands. When transitioning the folding spray implement from the stowed position toward the deployed position, the actuation moves the folding spray implement such that: (i) the inner wings swing outwardly from the chassis of the agricultural work vehicle by rotation about fold axes of the wing-to-frame fold joints; (ii) after the inner wings swing outwardly from the chassis of the agricultural work vehicle, a lower edge of the centerframe assembly is rotated upwardly in a manner placing the wing-to-wing fold joints in an orientation in which fold axes of the wing-to-wing fold joints extend principally in vertical directions; and (iii) the boom assemblies unfold by rotation of the outer wings relative to the inner wings about the fold axes of the wing-to-wing fold joints.

15. The folding spray implement of example 14, wherein the agricultural work vehicle further includes cradles on which the inner wings rest when the folding spray implement is in the stowed position. The actuation system lifts the inner wings from the cradles prior to causing the inner wings to swing outwardly from the chassis of the agricultural work vehicle.

CONCLUSION

There has thus been provided embodiments of folding spray implements possessing relatively low peak fold height-to-wingspan ratios, thereby permitting the folding spray implement satisfy relatively stringent peak fold height restrictions even when possessing a relatively broad (e.g., >30 meter) wingspan. Advantageously, embodiments of the folding spray implement achieve such favorable peak fold height-to-wingspan ratios, while minimizing the number of fold joints located along the respective lengths of the boom assemblies. Certain embodiments of the folding spray implement may achieve such relatively broad wingspans, while including boom assemblies each containing only a single wing-to-wing fold joint. By minimizing the number of fold joints and associated hardware (e.g., fold actuators), the overall weight, cost, and complexity of the folding spray implement is reduced. So too are the moment forces exerted on the wing-to-wing fold joints as the folding spray implement transitions between stowed and deployed positions, lessening reinforcement requirements (e.g., permitting the usage of support members lacking or having reduced localized wall thickening) and allowing down-sizing of the fold actuators (e.g., hydraulic cylinders), as desired.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A folding spray implement for usage in conjunction with an agricultural work vehicle, the folding spray implement comprising:
    a centerframe assembly;
    boom assemblies mounted to opposing sides of the centerframe assembly, the boom assemblies comprising:
    inner wings pivotally joined to the centerframe assembly for rotation about frame-to-wing fold joints; and
    outer wings pivotally joined to the inner wings for rotation about wing-to-wing fold joints; and
    an actuation system coupled to the centerframe assembly and to the boom assemblies, the actuation system configured to selectively transition the folding spray implement: (i) from a stowed position in which fold axes of the wing-to-wing fold joints extend in horizontal directions; (ii) through an intermediate unfolded position in which the fold axes of the wing-to-wing fold joints extend in vertical directions; and (iii) to a deployed position in which the fold axes of the wing-to-wing fold joints extend in horizontal directions, wherein the actuation system tilts the centerframe assembly about an axis parallel to a longitudinal axis of the folding spray implement (i) in a first rotational direction when transitioning the folding spray implement from the stowed position to the intermediate unfolded position, and (ii) in a second, opposing rotational direction when transitioning the folding spray implement from the intermediate position to the deployed position.

2. The folding spray implement of claim 1, wherein fold axes of the frame-to-wing fold joints extend in vertical directions when the folding spray implement is in the stowed and deployed positions; and
    wherein the fold axes of the frame-to-wing fold joints extend in horizontal directions when the folding spray implement is in the intermediate unfolded position.

3. The folding spray implement of claim 1, wherein the folding spray implement has a roll axis and a yaw axis perpendicular to the roll axis;
    wherein the fold axes of the wing-to-wing fold joints extend substantially parallel to the roll axis when the folding spray implement is in the stowed and deployed positions; and
    wherein the fold axes of the wing-to-wing fold joints extend substantially parallel to the yaw axis when the folding spray implement is in the intermediate unfolded positions.

4. The folding spray implement of claim 1, wherein the boom assemblies are folded when the folding spray implement is in the stowed position; and
    wherein the actuation system, when transition the folding spray implement from the stowed position to the deployed position, causes the boom assemblies to unfold when the fold axes of the wing-to-wing fold joints extend in vertical directions.

5. The folding spray implement of claim 1, wherein the wing-to-wing fold joints are the outermost fold joints of the folding spray implement, as taken along the longitudinal axis of the folding spray implement when in the deployed position.

6. The folding spray implement of claim 1, wherein the inner wings each have a first length $L_1$, as taken along the longitudinal axis of the folding spray implement;
    wherein the outer wings each have a second length $L_2$, as taken along the longitudinal axis; and
    wherein $L_1 > L_2 > 0.5(L_1)$.

7. The folding spray implement of claim 1, wherein the centerframe assembly comprises:
    a fixed centerframe joined to a chassis of the agricultural work vehicle; and
    a suspended centerframe mounted to the fixed frame and movable relative thereto in at least one degree of freedom (DOF), the boom assemblies mounted to opposing sides of the suspended centerframe.

8. The folding spray implement of claim 7, further comprising a centerframe motion lock between the fixed centerframe and the suspended centerframe, the centerframe motion lock deterring movement of the suspended centerframe relative to the fixed centerframe in the at least one DOF when the centerframe motion lock is engaged; and
    wherein the actuation system is configured to temporarily engage the centerframe motion lock when transitioning the folding spray implement between the stowed and deployed positions.

9. The folding spray implement of claim 1, wherein, when transitioning the folding spray implement from the stowed position to the intermediate unfolded position, the actuation system moves the folding spray implement such that:
    the boom assemblies swing outwardly from the chassis of the agricultural work vehicle by rotation about fold axes of the wing-to-frame fold joints;
    after the inner wings swing outwardly from the chassis, a lower edge of the centerframe assembly is rotated upwardly in a manner placing the wing-to-wing fold joints in an orientation in which the fold axes of the wing-to-wing fold joints extend in vertical directions; and
    the boom assemblies unfold by rotation of the outer wings relative to the inner wings about the fold axes of the wing-to-wing fold joints.

10. The folding spray implement of claim 9, wherein the agricultural work vehicle further comprises cradles on which the inner wings rest when in the stowed position; and
    wherein the actuation system lifts the inner wings from the cradles prior to causing the inner wings to swing outwardly from the chassis of the agricultural work vehicle.

11. The folding spray implement of claim 9, wherein, when transitioning the folding spray implement from the intermediate unfolded position to the deployed position, the actuation system further moves the folding spray implement such that:
    the lower edge of the centerframe assembly is rotated downwardly to return the wing-to-wing fold joints to an orientation in which the fold axes of the wing-to-wing fold joints extend in horizontal directions; and the folding spray implement is vertically lowered relative to a chassis of the agricultural work vehicle.

12. The folding spray implement of claim 1, wherein the boom assemblies extend adjacent and substantially parallel to opposing sides of the vehicle chassis when the folding spray implement is in the stowed position.

13. A folding spray implement for usage in conjunction with an agricultural work vehicle having a chassis, the folding spray implement comprising:
   boom assemblies each comprising wings pivotally joined at wing-to-wing fold joints;
   a centerframe assembly mounted to the chassis of the agricultural work vehicle, the boom assemblies joined to opposing sides of the centerframe assembly at frame-to-wing fold joints; and
   an actuation system coupled to the centerframe assembly and to the boom assemblies, the actuation system configured to transition the folding spray implement between stowed and deployed positions in accordance with operator commands;
   wherein, when transitioning the folding spray implement from the stowed position toward the deployed position, the actuation moves the folding spray implement such that:
      the inner wings swing outwardly from the chassis of the agricultural work vehicle by rotation about fold axes of the wing-to-frame fold joints;
      after the inner wings swing outwardly from the chassis of the agricultural work vehicle, a lower edge of the centerframe assembly is rotated upwardly in a manner placing the wing-to-wing fold joints in an orientation in which fold axes of the wing-to-wing fold joints extend in vertical directions;
      the boom assemblies unfold by rotation of the outer wings relative to the inner wings about the fold axes of the wing-to-wing fold joints;
      the lower edge of the centerframe assembly is rotated downwardly to return the wing-to-wing fold joints to an orientation in which the fold axes of the wing-to-wing fold joints extend in horizontal directions; and
      the folding spray implement is vertically lowered relative to the chassis of the agricultural work vehicle.

14. The folding spray implement of claim 13, wherein the agricultural work vehicle further comprises cradles on which the inner wings rest when the folding spray implement is in the stowed position; and
   wherein the actuation system lifts the inner wings from the cradles prior to causing the inner wings to swing outwardly from the chassis of the agricultural work vehicle.

15. The folding spray implement of claim 13, wherein the centerframe assembly comprises a centerframe to which the boom assemblies attach; and
   wherein the actuation system rotates the centerframe assembly (i) from a vertical orientation to a horizontal orientation when transitioning the folding spray implement from the stowed position to the intermediate unfolded position, and (ii) from the horizontal orientation to the vertical orientation when transitioning the folding spray implement from the intermediate unfolded position to the deployed position.

16. An agricultural work vehicle, comprising:
   a chassis; and
   a folding spray implement, comprising:
      a centerframe assembly mounted to the chassis;
      boom assemblies mounted to opposing sides of the centerframe assembly, the boom assemblies comprising:
         inner wings pivotally joined to the centerframe assembly for rotation about frame-to-wing fold joints; and
         outer wings pivotally joined to the inner wings for rotation about wing-to-wing fold joints; and
      an actuation system coupled to the centerframe assembly and to the boom assemblies, the actuation system configured to selectively transition the folding spray implement: (i) from a stowed position in which fold axes of the wing-to-wing fold joints extend in horizontal directions; (ii) through an intermediate unfolded position in which the fold axes of the wing-to-wing fold joints extend in vertical directions; and (iii) to a deployed position in which the fold axes of the wing-to-wing fold joints extend in horizontal directions, wherein the actuation system tilts the centerframe assembly about an axis parallel to a longitudinal axis of the folding spray implement (i) in a first rotational direction when transitioning the folding spray implement from the stowed position to the intermediate unfolded position, and (ii) in a second, opposing rotational direction when transitioning the folding spray implement from the intermediate position to the deployed position.

17. The agricultural work vehicle of claim 16, wherein the folding spray implement has a roll axis and a yaw axis perpendicular to the roll axis;
   wherein the fold axes of the wing-to-wing fold joints are substantially parallel with the roll axis when the folding spray implement is in the stowed and deployed positions; and
   wherein the fold axes of the wing-to-wing fold joints are substantially parallel with the yaw axis when the folding spray implement is in the intermediate unfolded positions.

18. The agricultural work vehicle of claim 16, wherein fold axes of the frame-to-wing fold joints extend in horizontal directions in the intermediate unfolded position; and
   wherein the fold axes of the frame-to-wing fold joints extend in vertical directions in the stowed and deployed positions.

* * * * *